(12) United States Patent
Michaud et al.

(10) Patent No.: US 9,359,459 B2
(45) Date of Patent: Jun. 7, 2016

(54) HYDROCARBON-BASED POLYMERS COMPRISING TWO END GROUPS WITH 2-OXO-1,3-DIOXOLAN-4-YL ENDINGS, PREPARATION THEREOF AND USE THEREOF

(71) Applicant: BOSTIK SA, La Plaine St Denis (FR)

(72) Inventors: Guillaume Michaud, Compiegne (FR); Frederic Simon, Pont l'Eveque (FR); Stephane Fouquay, Mont Saint-aignan (FR); Liana Annunziata, Salerno (IT); Sophie Guillaume, Vitre (FR); Jean Francois Carpentier, Acigne (FR)

(73) Assignee: BOSTIK SA, La Plaine St Denis (FR)

( * ) Notice: Subject to any disclaimer, the term of this patent is extended or adjusted under 35 U.S.C. 154(b) by 0 days.

(21) Appl. No.: 14/651,798

(22) PCT Filed: Dec. 13, 2013

(86) PCT No.: PCT/FR2013/053075
§ 371 (c)(1),
(2) Date: Jun. 12, 2015

(87) PCT Pub. No.: WO2014/091173
PCT Pub. Date: Jun. 19, 2014

(65) Prior Publication Data
US 2015/0315310 A1    Nov. 5, 2015

(30) Foreign Application Priority Data
Dec. 14, 2012   (FR) ...................................... 12 62051

(51) Int. Cl.
| | | |
|---|---|---|
| *C08F 132/04* | (2006.01) | |
| *C08G 61/08* | (2006.01) | |
| *C08G 71/04* | (2006.01) | |
| *C08F 8/14* | (2006.01) | |
| *C08F 8/04* | (2006.01) | |

(52) U.S. Cl.
CPC ................. *C08F 132/04* (2013.01); *C08F 8/14* (2013.01); *C08G 71/04* (2013.01); *C08G 61/08* (2013.01); *C08G 2261/126* (2013.01); *C08G 2261/1644* (2013.01); *C08G 2261/3322* (2013.01); *C08G 2261/418* (2013.01); *C08G 2261/74* (2013.01)

(58) Field of Classification Search
CPC .. C08G 61/08; C08G 71/04; C08G 2261/418; C08G 2261/1644; C08F 8/04; C08F 132/04
USPC ........................................................ 526/171
See application file for complete search history.

(56) References Cited

U.S. PATENT DOCUMENTS

| | | | | |
|---|---|---|---|---|
| 5,132,458 A | * | 7/1992 | Honel .................... | C08G 18/10 524/591 |
| 5,340,889 A | * | 8/1994 | Crawford .............. | C07C 269/04 525/523 |
| 5,728,917 A | | 3/1998 | Grubbs et al. | |
| 2013/0144027 A1 | | 6/2013 | Guillaume et al. | |

FOREIGN PATENT DOCUMENTS

WO     2012/007254 A1    1/2012

OTHER PUBLICATIONS

International Search Report dated Mar. 10, 2014 issued in corresponding PCT/FR2013/053075 application (pp. 1-2).

* cited by examiner

*Primary Examiner* — Fred M Teskin
(74) *Attorney, Agent, or Firm* — Millen, White, Zelano & Branigan, P.C.

(57) ABSTRACT

Process for the preparation of a hydrocarbon polymer comprising two end groups having 2-oxo-1,3-dioxolan-4-yl final parts by ring opening metathesis in the presence of a metathesis catalyst, of a chain transfer agent comprising a carbonate ring and of a compound of formula comprising at least one $C_6$-$C_{16}$ ring having a carbon-carbon double bond.
Hydrocarbon polymer capable of being obtained by this process.
Process for the preparation of polyurethanes by reaction of this polymer and of a compound comprising at least one amine group, and polyurethanes thus obtained.

17 Claims, No Drawings

HYDROCARBON-BASED POLYMERS COMPRISING TWO END GROUPS WITH 2-OXO-1,3-DIOXOLAN-4-YL ENDINGS, PREPARATION THEREOF AND USE THEREOF

The subject matter of the present invention is a process for the preparation of at least one hydrocarbon polymer comprising two ends each comprising a 2-oxo-1,3-dioxolan-4-yl (or cyclocarbonate) ending connected to the main chain of the polymer via an alkylene bond, and optionally a divalent carboxyl or oxy group, i.e. two end groups

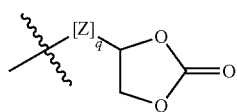

where the Z group is composed of at least one alkylene group optionally directly connected to a divalent carboxyl or oxy group, the Z group comprising from 1 to 19 carbon atoms and q being an integer equal to 0 or 1.

The invention also relates to the hydrocarbon polymers capable of being thus obtained and to the use of these hydrocarbon polymers for the preparation of polyurethanes, without isocyanate, by reaction with at least one compound comprising at least one amine group. These polyurethanes, once formulated, are intended to be used in coatings, mastics or adhesives, as additives and/or as resins.

The synthesis of polyurethanes is conventionally carried out by reaction between a diol and a diisocyanate. Diisocyanates are toxic compounds as such and are generally obtained from phosgene, itself highly toxic by inhalation or by contact. The manufacturing process used in industry generally employs the reaction of an amine with an excess of phosgene in order to form an isocyanate.

The search for alternatives for the synthesis of polyurethanes without using isocyanate (or NIPU for "Non Isocyanate PolyUrethane") thus represents a major challenge.

This search has formed the subject of numerous studies. The paths most studied relate to the use of polymers capable of reacting with amines or amino oligomers to form polyurethanes.

Thus, the patent application US 2007/0151666, from Henkel Corp., describes an adhesive agent system which comprises at least two components A and B, where A is a polymeric component comprising at least two 2-oxo-1,3-dioxolan-4-yl final parts and where B is a component comprising at least two primary and/or secondary amine groups. Such an adhesive agent system is used as two-component adhesive, that is to say that the two components are mixed at the time of the adhesive bonding. The invention describes mainly components A which are polymers comprising, at each of their ends, a 2-oxo-1,3-dioxolan-4-yl final part bonded to a polymer chain via an ester or urethane (carbamate) functional group substituted at the α position of the 1,3-dioxolan-2-one, i.e. a (2-oxo-1,3-dioxolan-4-yl)methylcarbamate or (2-oxo-1,3-dioxolan-4-yl)methyloxycarbonyl end group. It is not envisaged that the polymer carrying these end groups of the component A can be a saturated or unsaturated hydrocarbon polymer (such as a polyolefin).

The patent application US 2010/0312012, from Evonik Degussa, describes unsaturated hydrocarbon polymers, comprising at least two carbon-carbon double bonds, formed by metathesis from cyclic hydrocarbons and acrylic acid in the presence of the ruthenium-based catalyst. These cyclohydrocarbons are, for example, 1,5-cyclooctadiene, cyclododecene, 1,5,9-cyclododeca-triene, cycloheptene, cyclohexene or cyclopentene. The unsaturated compounds thus obtained have two carboxylic acid —$CO_2H$ final parts. Such α,ω-dicarboxyl unsaturated hydrocarbon polymers are essentially intended for the synthesis of polyesters and polyamides.

It is an aim of the present invention to provide novel polymers which make possible the synthesis of polyurethanes without using isocyanate. The invention thus represents an alternative solution to the synthesis of polyurethanes without using isocyanate.

Thus, the present invention relates to a process for the preparation of at least one hydrocarbon polymer comprising two end groups having 2-oxo-1,3-dioxolan-4-yl final parts, said process comprising at least one stage of ring opening metathesis polymerization in the presence:
- of at least one metathesis catalyst, preferably a ruthenium-comprising catalyst, more preferably still a Grubbs' catalyst;
- of at least one chain transfer agent (CTA) compound of formula (15):

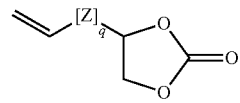

the Z group being composed of at least one alkylene group optionally connected to a divalent carboxyl or oxy group, the Z group comprising from 1 to 19 carbon atoms and q being an integer equal to 0 or 1; and
- of at least one compound chosen from compounds comprising at least one hydrocarbon ring and generally from 6 to 16, preferably from 6 to 12, carbon atoms per ring, said ring comprising at least one carbon-carbon double bond, and the substituted derivatives of this compound, said compound being of formula (7):

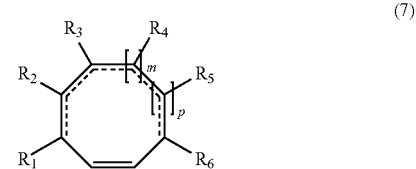

in which:
- each carbon-carbon bond of the chain denoted ⤳ is a double bond or a single bond, in accordance with the valency rules of organic chemistry;
- the $R_1$ and $R_6$ groups are either both hydrogen or each different from hydrogen and bonded to one another as members of one and the same ring or heterocycle which is saturated or unsaturated (i.e., comprising at least one carbon-carbon double bond, including aromatics);
- the $R_2$, $R_3$, $R_4$ and $R_5$ groups are each, independently or not of the other groups, a hydrogen, a halo group, an alkoxycarbonyl group or an alkyl group, it being possible for the $R_2$ to $R_5$ groups to be bonded to one another as members of one and the same saturated or unsaturated ring or heterocycle;

m and p are integers each within a range extending from 0 to 5, the sum m+p being itself within a range from 0 to 6;

said stage being carried out for a period of time strictly of greater than 3 h when the compound of formula (15) is 4-vinyl-1,3-dioxolan-2-one and for a period of time of greater than or equal to 2 h in all the other cases.

When m=0, this means that there is no group between the square brackets to which m applies and that the two carbon-carbon bonds each overlapping one of the square brackets constitute only a single carbon-carbon bond. This likewise applies for p=0 or q=0.

The molar ratio of the compound comprising at least one hydrocarbon ring to CTA is generally within a range from 1 to 10 000 and preferably 1 to 100.

Generally, the compound of formula (7) is such that the chain of the ring is preferably composed of carbon atoms but at least one carbon atom may be replaced by another atom, such as oxygen.

The compounds of formula (7) are or are not substituted. Substitution is understood to mean, according to the invention, the presence of a group, generally replacing a hydrogen, the substitution being of cyclic or acyclic alkyl type, of alkoxycarbonyl type or of halo type and the substitution preferably being located in the β, γ or δ position with respect to the carbon-carbon double bond, more preferably still in the γ or δ position with respect to the carbon-carbon double bond. Thus, the substituted derivatives of the compounds of formula (7) comprise the compounds of formula (7) comprising at least one second ring comprising at least one carbon-carbon bond in common with the first ring.

In a preferred embodiment of the invention, these compounds are not substituted, that is to say that $R_1=R_2=R_3=R_4=R_5=R_6=H$.

In a preferred embodiment of the invention, which is or is not independent of the preceding embodiment, m=p=1.

Ring opening metathesis polymerization (ROMP) is a reaction well known to a person skilled in the art which is here carried out in the presence of compound of formula (15).

The Z group is preferably composed either of a single alkylene group optionally connected to a divalent carboxyl or oxy group or of two alkylene groups which are optionally connected to a divalent oxy or carboxyl group. In the latter case, a single oxy or carboxyl group is generally present, most often between the two alkylene groups. In the case where a single alkylene group is connected to a divalent carboxyl or oxy group, this carboxyl or oxy group is preferably located at the end of the Z group.

The compound of formula (15) is preferably chosen from the compounds listed below:

4-vinyl-1,3-dioxolan-2-one (or 4-ethenyl-1,3-dioxolan-2-one or vinyl ethylene carbonate) (if q=0) of formula:

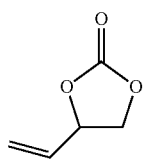

4-(vinyloxymethyl)-1,3-dioxolan-2-one (if q=1 and Z is —O—CH$_2$—) of formula:

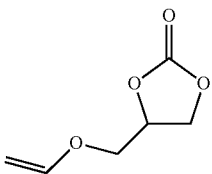

4-(acryloyloxymethyl)-1,3-dioxolan-2-one (or (2-oxo-1,3-dioxolan-4-yl)methyl propenoate) (if q=1 and Z is —COO—CH$_2$—) of formula:

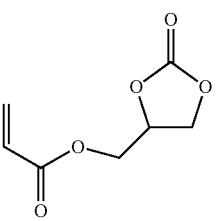

4-(alkenyloxymethyl)-1,3-dioxolan-2-ones (if q=1 and Z is —(CH$_2$)$_n$—O—CH$_2$— with n an integer from 1 to 9) of formula:

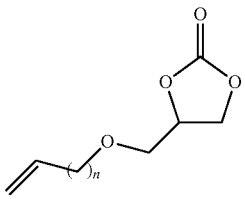

4-(alkenoyloxymethyl)-1,3-dioxolan-2-ones (if q=1 and Z is —(CH$_2$)$_{n'}$—COO—CH$_2$—, with n' an integer from 1 to 8) of formula:

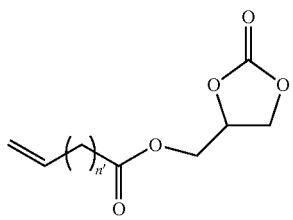

Particularly preferably, the compound of formula (15) is 4-(acryloyloxymethyl)-1,3-dioxolan-2-one of formula:

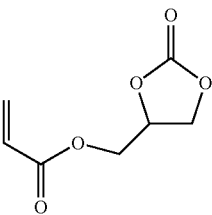

or 4-vinyl-1,3-dioxolan-2-one of formula:

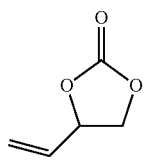

The cyclic compounds of formula (7) are preferably according to the invention chosen from the group formed by cycloheptene, cyclooctene, cyclononene, cyclodecene, cycloundecene, cyclododecene, 1,5-cyclooctadiene, cyclononadiene, 1,5,9-cyclodecatriene and also norbornene, norbornadiene, dicyclopentadiene, 7-oxa-norbornene and 7-oxanorbornadiene respectively of formulae:

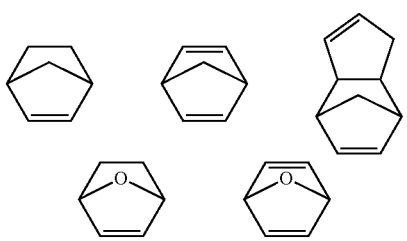

Cyclooctene (COE), norbornene and dicyclopentadiene (DCPD) are very particularly preferred.

Mention may also be made of the mono- or polysubstituted derivatives of these cyclic compounds, such as, preferably, alkylcyclooctenes, alkylcycloocta-dienes, halocycloalkenes and alkylcarbonylcycloalkenes. In such a case, the alkyl, halo and alkoxycarbonyl groups have the meanings given above. The alkyl groups are generally in the β, γ or δ position with respect to the carbon-carbon double bond, more preferably still in the γ or δ position with respect to the carbon-carbon double bond.

The ring opening metathesis polymerization is generally carried out in the presence of at least one solvent, generally chosen from the group formed by the aqueous, organic or polar solvents typically used in polymerization reactions and which are inert under the conditions of the polymerization, such as aromatic hydrocarbons, chlorinated hydrocarbons, ethers, aliphatic hydrocarbons, water or their mixtures. A preferred solvent is chosen from the group formed by benzene, toluene, para-xylene, methylene chloride, dichloroethane, dichlorobenzene, chlorobenzene, tetrahydrofuran, diethyl ether, pentane, water and their mixtures. More preferably still, the solvent is chosen from the group formed by benzene, toluene, para-xylene, methylene chloride, dichloroethane, dichlorobenzene, chlorobenzene, tetrahydrofuran, diethyl ether, pentane and their mixtures. More particularly preferably still, the solvent is tetrahydrofuran, toluene or a mixture of toluene and methylene chloride. The solubility of the polymer formed during the polymerization reaction depends generally and mainly on the choice of the solvent and on the molar weight of the polymer obtained. It is also possible for the reaction to be carried out without solvent.

The metathesis catalyst, such as, for example, a Grubbs' catalyst, is generally a commercial product.

The metathesis catalyst is generally a transition metal catalyst, including in particular a ruthenium-comprising catalyst, generally in the form of ruthenium complex(es), such as ruthenium-carbene. Use may thus be made, particularly preferably of Grubbs' catalysts. Grubbs' catalyst is generally understood to mean, according to the invention, a $1^{st}$ and $2^{nd}$ generation Grubbs' catalyst but also any other catalyst of Grubbs' type (comprising ruthenium-carbene) accessible to a person skilled in the art, such as, for example, the substituted Grubbs' catalysts described in the patent U.S. Pat. No. 5,849,851.

A $1^{st}$ generation Grubbs' catalyst is generally of formula (8):

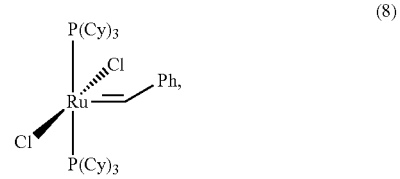

where Ph is phenyl and Cy is cyclohexyl.

The P(Cy)₃ group is a tricyclohexylphosphine group.

The IUPAC name for this compound is: benzylidene-bis(tricyclohexylphosphine)dichlororuthenium (of CAS number 172222-30-9).

A $2^{nd}$ generation Grubbs' catalyst is generally of formula (9):

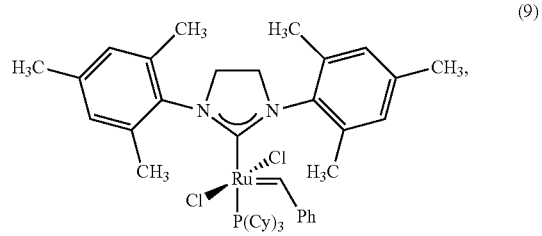

where Ph is phenyl and Cy is cyclohexyl.

The IUPAC name of the second generation of this catalyst is benzylidene[1,3-bis(2,4,6-trimethylphenyl)-2-imidazolidinylidene]dichloro(tricyclohexylphosphine)-ruthenium (of CAS number 246047-72-3).

The present invention also relates to any hydrocarbon polymer comprising two end groups having 2-oxo-1,3-dioxolan-4-yl final parts capable of being obtained by the process according to the invention.

Preferably, this polymer has two end groups, each having the formula:

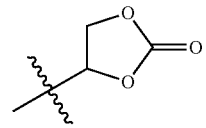 [SMILES: *C1COC(=O)O1]

(where q=0); or also formula:

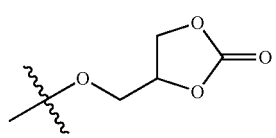 [SMILES: *OCC1COC(=O)O1]

(where q=1 and Z is a methylene connected to an oxy group); or also formula:

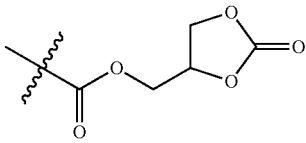 [SMILES: *C(=O)OCC1COC(=O)O1]

(where q=1 and Z is a methylene connected to a carboxyl group); or also formula:

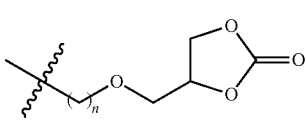

(where q=1 and Z is an alkylene having n carbon atoms which is connected to a methylene via an oxy group); or also formula:

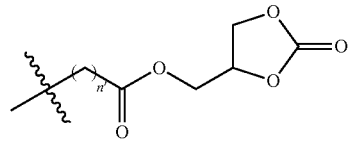

(where q=1 and Z is an alkylene having n' carbon atoms which is connected to a methylene via a carboxyl group).

Particularly preferably, this polymer has two end groups, each having the formula:

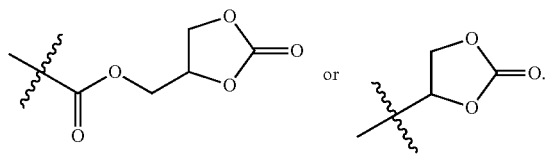 [SMILES: *C(=O)OCC1COC(=O)O1 ; *C1COC(=O)O1]

The invention also relates to a (other) process for the preparation of at least one hydrocarbon polymer according to the invention in the case where y=0, where q=1 and where Z is —$CH_2$—COO—, said process comprising at least one stage of esterification of an unsaturated hydrocarbon polymer having two carboxylic acid final parts by 4-(hydroxymethyl)-1,3-dioxolan-2-one (or glycerol carbonate). These dicarboxyl unsaturated precursor compounds and their synthesis are, for example, as described in the patent application US 2010/0312012.

The preparation process according to the invention, whether it comprises at least one stage of ring opening methathesis polymerization or at least one stage of esterification, can additionally comprise at least one additional stage of hydrogenation of carbon-carbon double bonds. Very obviously, this stage is only carried out on an unsaturated hydrocarbon polymer. The hydrogenation of at least one carbon-carbon double bond, preferably the complete hydrogenation of the carbon-carbon double bonds, is thus carried out.

This stage is generally carried out by catalytic hydrogenation, generally under hydrogen pressure and in the presence of a hydrogenation catalyst, such as a Pd/C catalyst.

The invention also relates to a hydrocarbon polymer comprising two end groups having 2-oxo-1,3-dioxolan-4-yl final parts, said hydrocarbon polymer being capable of being obtained according to the process of the invention, said hydrocarbon polymer being of formula (1):

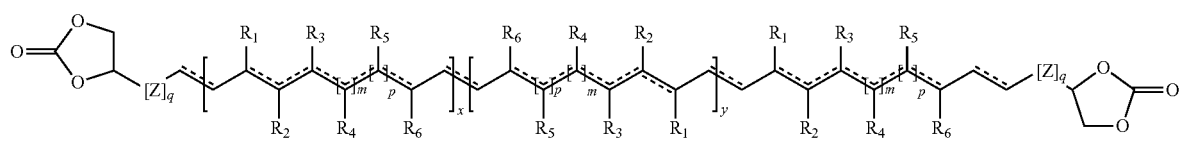

(1)

in which:
each carbon-carbon bond of the chain denoted ⤳ is a double bond or a single bond, in accordance with the valency rules of organic chemistry;
the $R_1$ and $R_6$ groups are either both hydrogen or each different from hydrogen and bonded to one another as members of one and the same ring or heterocycle which is saturated or unsaturated (i.e., comprising at least one carbon-carbon double bond, including aromatics);
the $R_2$, $R_3$, $R_4$ and $R_5$ groups are each, independently or not of the other groups, a hydrogen, a halo group, an alkoxycarbonyl group or an alkyl group, it being possible for the $R_2$ to $R_5$ groups to be bonded to one another as members of one and the same saturated or unsaturated ring or heterocycle;
the Z group is composed of at least one alkylene group optionally connected to a divalent carboxyl or oxy group, the Z group comprising from 1 to 19 carbon atoms;
q is a number equal to 0 or 1;
m and p are integers each within a range extending from 0 to 5, the sum m+p being itself within a range from 0 to 6; and
x and y are each an integer, independently of one another, the sum x+y being such that the number-average molar mass Mn of the hydrocarbon polymer of formula (1) is within a range from 600 to 20 000 g/mol, and the polydispersity (PDI) of the hydrocarbon polymer of formula (1) is within a range from 1.1 to 3.0 and preferably from 1.4 to 2.5.

The polymer capable of being obtained by the process according to the invention is preferably a polymer of formula (1).

In addition, polymer is spoken of here but it more specifically relates to a mixture of polymers represented by the formula (1), as is well known to a person skilled in the art. In this respect, the molar masses are "average" molar masses.

The polymer of formula (1) can thus be written schematically $TA_xB_yAT$, where A is the monomer unit present x times, B is the monomer unit present y times and T is the end group.

Very obviously, all the formulae given here are in accord with the valency rules of organic chemistry.

In the specific case where y=0, where q=1 and where Z is —$CH_2$—COO—, the formula (1) becomes the following formula:

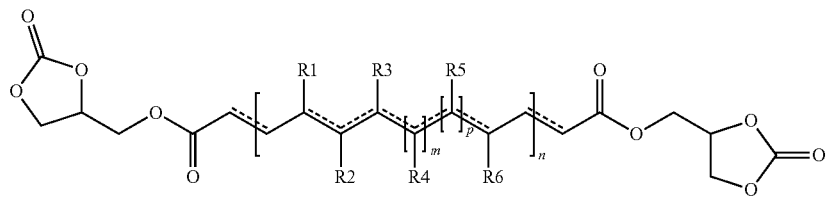

However, the way of writing the formula (1) is very obviously to a person skilled in the art a simplified way of writing. The copolymer $A_{x-1}B_y$ is a copolymer having a random homogeneous structure (i.e., a copolymer composed of macromolecules in which the probability of finding a given monomer unit A or B at a given point of the chain is independent of the nature of the adjacent monomer units) or periodic homogeneous structure (i.e., a copolymer composed of macromolecules comprising two monomer units in a regular sequential order, for example an alternating order) or statistical homogeneous structure (i.e., a copolymer composed of macromolecules in which the distribution of the monomer units obeys known statistical laws). In such a polymer, only the monomer unit A is indeed present at both ends of the polymer, alone at one end or in contact with T at the other end. Without wishing to be restricted to a theory, the inventors believe that it is highly probable that the copolymer $A_{x-1}B_y$ is a copolymer having a random homogeneous structure. The monomer units A and B are thus randomly distributed along the main chain of the polymer.

This simplified way of writing is, of course, valid for all the formulae of polymers which will be described below, including those of the examples.

When y=0, this means that there is no group between the square brackets to which y applies and that the two carbon-carbon bonds overlapping each one of the square brackets constitute only a single carbon-carbon bond. Very obviously, all the formulae given here are in accord with the valency rules of organic chemistry.

Within the meaning of the description, the Z group is symmetrical with respect to the main chain of the polymer. This is thus understood to mean that, if, for example, Z is bonded to the cyclocarbonate via one bond (for example —$CH_2$—COO—, $CH_2$ being bonded to the cyclocarbonate group) in one end group, q being equal to 1, the Z group is bonded to the cyclocarbonate group via the same bond in the other end group (i.e., the $CH_2$ of —$CH_2$—COO— will also be bonded to the cyclocarbonate). It is this which will be illustrated below for the polymer of formula (101).

(101), with n=x+1. In this case, the two end groups are (2-oxo-1,3-dioxolan-4-yl)methyloxycarbonyl.

Alkyl group is understood to mean, according to the invention, a linear or branched, cyclic, acyclic, or polycyclic hydrocarbon compound generally comprising from one to twenty-two carbon atoms. Such an alkyl group generally comprises from 1 to 4 and preferably from 1 to 2 carbon atoms.

Halo group is understood to mean, according to the invention, an iodo, chloro, bromo or fluoro group, preferably a chloro group.

Heterocycle is understood to mean, according to the invention, a ring which can comprise another atom than carbon in the chain of the ring, such as, for example, oxygen.

Alkoxycarbonyl group is understood to mean, according to the invention, a saturated or partially unsaturated, linear or branched, divalent alkylene group comprising from one to twenty-two, preferably from one to eight, more preferably still from one to six, carbon atoms and such that a chain of carbon atoms which it comprises additionally comprises a divalent —COO— group.

The polydispersity PDI (or dispersity $Đ_M$) is defined as the Mw/Mn ratio, that is to say the ratio of the weight-average molar mass to the number-average molar mass of the polymer.

The two average molar masses Mn and Mw are measured according to the invention by size exclusion chromatography (SEC), normally with PEG (PolyEthylene Glycol) or PS (PolyStyrene) calibration.

End group is understood to mean a group located at the chain end (or ends) of the polymer.

If it is unsaturated, the polymer according to the invention generally comprises a plurality of (i.e., more than two) carbon-carbon double bonds.

In a preferred embodiment, the polymer of formula (1) comprises only a single carbon-carbon double bond per repeat unit [ . . . ] and the polymer is of formula (1'):

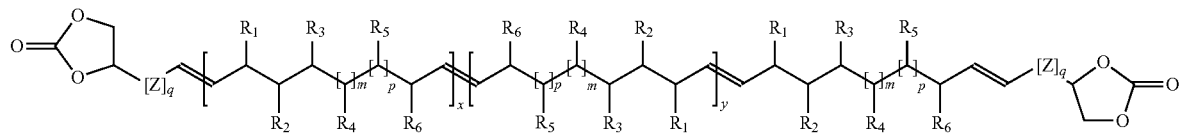

(1')

In this case, preferably, m is equal to 1 and p is equal to 1.

Preferably, the invention relates to a hydrocarbon polymer comprising two end groups having 2-oxo-1,3-dioxolan-4-yl final parts, said hydrocarbon polymer being of formula (2) or of formula (3):

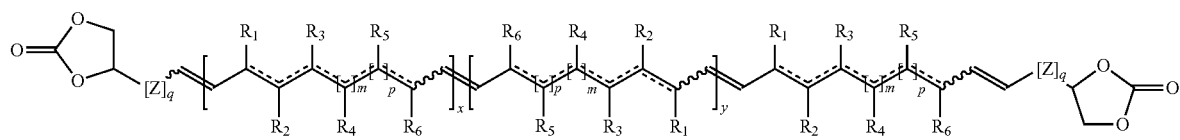

(2)

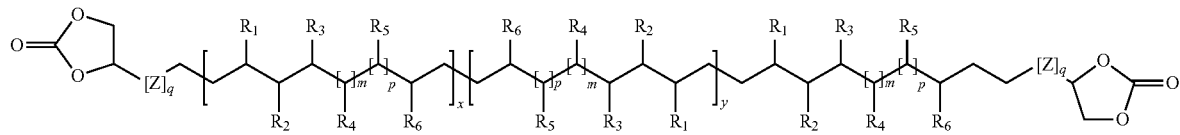

(3)

in which $\sim$, m, p, q, Z, x, y, $R_1$, $R_2$, $R_3$, $R_4$, $R_5$ and $R_6$ have the meanings given above and, as is known to a person skilled in the art, the $\sim$ bond means that the bond is oriented geometrically on one side or the other with respect to the double bond, i.e. Z (for Zusammen=cis) or E (for Entgegen=trans).

Particularly preferably, m is equal to 1 and p is equal to 1.

In the specific case where y=0, where q=1 and where Z is —$CH_2$—COO—, the formulae (2) and (3) respectively become the following formulae:

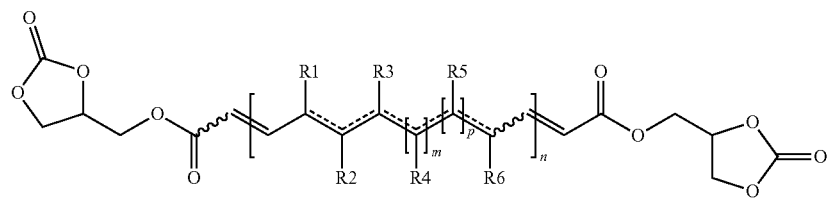

(102) with n=x+1, wherein the $\sim$ bond means that the bond is oriented geometrically on one side or the other with respect to the double bond, i.e. Z (for Zusammen=cis) or E (for Entgegen=trans); and

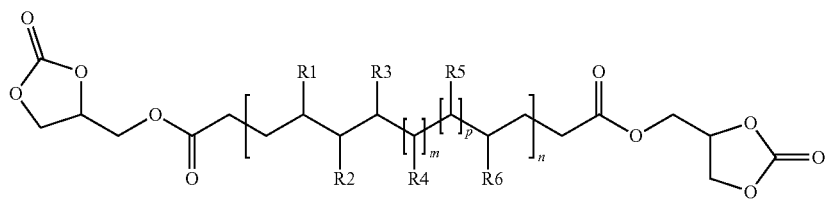

(103) with n=x+1.

The polymer of formula (2) is generally of trans (E)-trans (E), trans (E)-cis (Z) or cis (Z)-cis (Z) orientation. The three isomers are generally present in variable proportions, generally with a majority of trans (E)-trans (E). It is possible according to the invention for the trans (E)-trans (E) isomer to be present quasi-predominantly.

The formula (2) illustrates the case where the repeat units of the main chain of the polymer of formula (1) are unsaturated and each comprise at least one carbon-carbon double bond. In a preferred embodiment, the polymer of formula (2) comprises only a single carbon-carbon double bond per repeat unit and the polymer is of formula (2'):

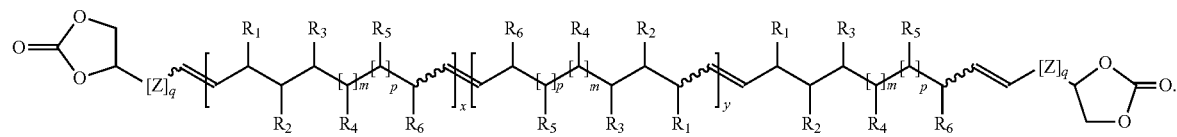

(2')

The formula (3) illustrates the case where the main chain of the polymer of formula (1) is saturated.

The polymer of formula (3) can, for example, result from the hydrogenation of the polymer of formula (2).

According to a preferred embodiment of the invention, the invention relates to a hydrocarbon polymer comprising two end groups having 2-oxo-1,3-dioxolan-4-yl final parts, said hydrocarbon polymer being of formula (4):

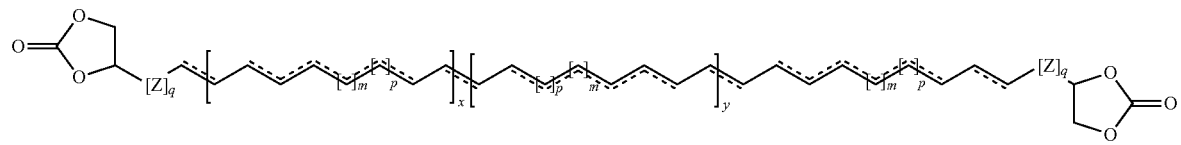

(4)

in which ⌇, m, p, q, Z, x and y have the meanings given above.

In the specific case where y=0, where q=1 and Z is —$CH_2$—COO—, the formula (4) becomes the following formula:

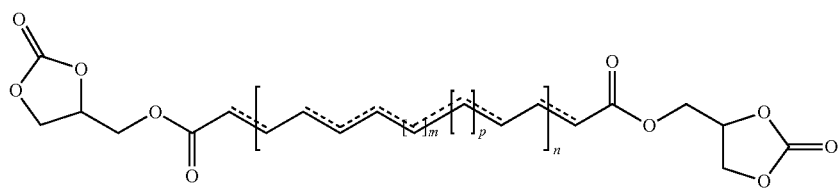

(104) with n=x+1.

The formula (4) corresponds to the formula (1) in which $R_1$, $R_2$, $R_3$, $R_4$, $R_5$ and $R_6$ are each a hydrogen (H). In a preferred embodiment, the polymer of formula (4) comprises at most only a single carbon-carbon double bond per repeat unit and the polymer is of formula (4'):

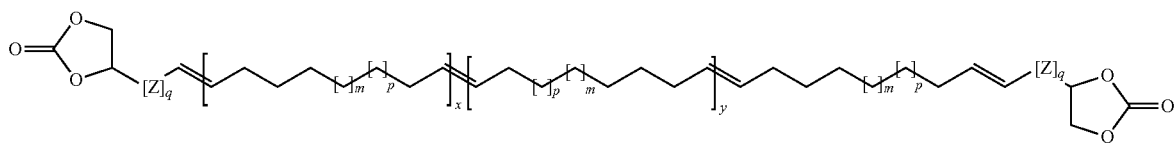

(4')

According to this embodiment, preferably, the invention relates to a hydrocarbon polymer comprising two end groups having 2-oxo-1,3-dioxolan-4-yl final parts, said hydrocarbon polymer being of formula (5) or of formula (6):

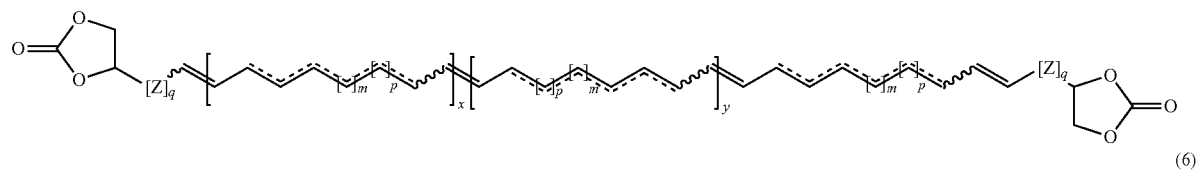

(5)

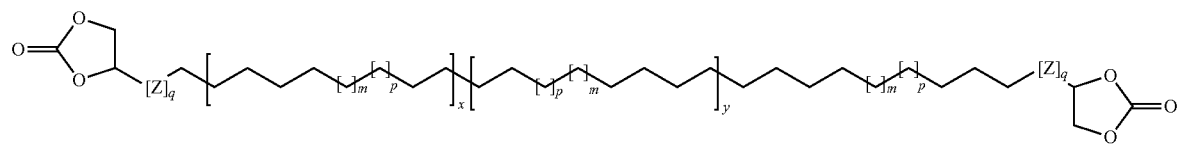

(6)

in which ⌇, ⌇⌇, m, p, q, Z, x and y have the meanings given above.

In the specific case where y=0, where q=1 and where Z is —$CH_2$—COO—, the formulae (5) and (6) respectively become the following formulae:

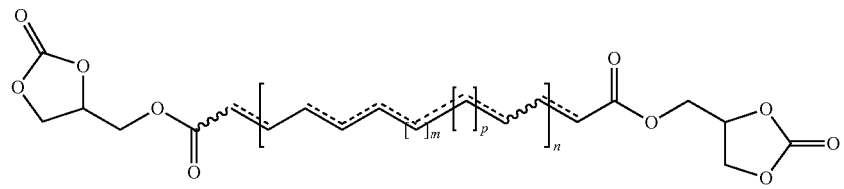

(105) where n=x+1; and

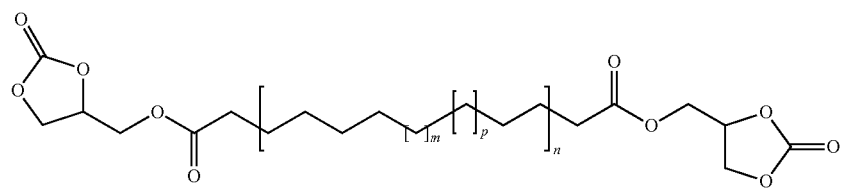

(106) with n=x+1.

The formula (5) illustrates the case where the repeat unit of the main chain of the polymer of formula (4) is unsaturated and comprises at least one carbon-carbon double bond.

In a preferred embodiment, the polymer of formula (5) comprises only a single carbon-carbon double bond per repeat unit and the polymer is of formula (5'). In this case, preferably, m is equal to 1 and p is equal to 1.

The synthesis reactions of examples 1 to 4 were carried out in two stages: a first stage of synthesis of the transfer agent (example 1) and a second stage of ROMP ring opening polymerization of cyclooctene (COE) in the presence of a Grubbs' catalyst and of the transfer agent thus synthesized (example 2).

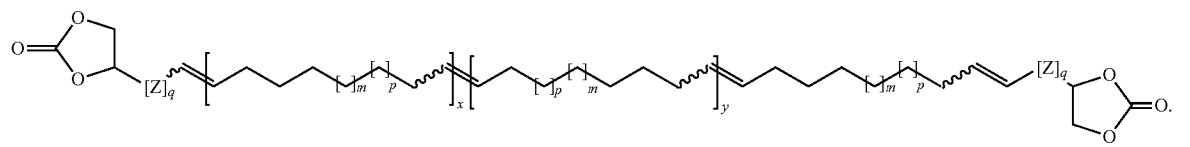

(5')

The formula (6) illustrates the case where the main chain of the polymer of formula (4) is saturated.

The polymer of formula (6) can, for example, result from the hydrogenation of the polymer of formula (5).

The transfer agent (CTA) for examples 1 to 4 was (2-oxo-1,3-dioxolan-4-yl)methyl propenoate.

A polymer compound of following formula (10) was thus synthesized from the CTA and COE in examples 1 to 4:

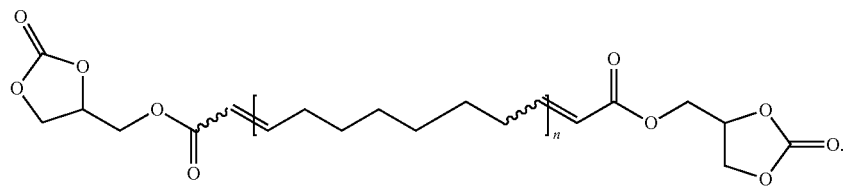

(10)

The formulae (5) and (6) correspond to the formulae (2) and (3) in which $R_1$, $R_2$, $R_3$, $R_4$, $R_5$ and $R_6$ are each a hydrogen (H).

Finally, the invention relates to a process for the preparation of polyurethanes comprising the reaction of at least one polymer according to the invention, i.e. capable of being obtained by the process of the invention and optionally of formula (1), with at least one compound comprising at least one, preferably at least two, amine groups, for example chosen from amines, diamines, triamines and polyamines, and also to the polyurethanes capable of being obtained by this preparation process.

The amines are preferably such that at least one amine group, preferably all the amine groups, are primary amine groups.

The polyurethanes thus obtained, which are novel, are advantageously without isocyanate.

These polyurethanes, once formulated (i.e., formulated with other optional additives), are intended to be used in coatings, mastics or adhesives, as fillers and/or as resins. It is also possible to independently formulate the polymer of formula (1) and the compound comprising at least one amine group, before they are mixed.

The invention will be better understood in the light of the examples which follow.

EXAMPLES

The examples which follow illustrate the invention without, however, limiting the scope thereof.

This compound (10) is a compound of formula (5') in which n=x+1, m is equal to 1, y is equal to 0, Z is —$CH_2$—COO—, q is equal to 1 and p is equal to 1.

The synthesis reaction of example 5 was carried out in a single stage.

The transfer agent (CTA) for example 5 was 4-vinyl-1,3-dioxolan-2-one.

A polymer was thus synthesized from the CTA and COE in example 5. This was a compound of formula (5') in which n=x+1, m is equal to 1, y is equal to 0, q is equal to 0 and p is equal to 1.

Experimental Protocol

All the experiments were carried out, if necessary, under an argon atmosphere.

The 4-(hydroxymethyl)-1,3-dioxolan-2-one (or glycerol carbonate) was a product from ABCR Chemical. All the other reactants ($2^{nd}$ generation Grubbs' catalyst of formula (9) and the acryloyl chloride (or acrylic acid chloride or propenoic acid chloride)) were products from Aldrich. The 4-vinyl-1,3-dioxolan-2-one was also a product from Aldrich.

The cyclooctene (COE) was a product from Aldrich, which was distilled over $CaH_2$ and degassed before use.

The tetrahydrofuran (THF) was subjected to reflux under Na/benzophenone, distilled and degassed before use. All the other solvents were used as received.

The FTIR (Fourier Transform InfraRed) spectra were recorded on a Shimadzu IRAffinity-1 device.

The NMR spectra were recorded on AM-500 Bruker and AM-400 Bruker spectrometers, at 298 K in $CDCl_3$. The chemical shifts were referenced with respect to tetramethylsilane (TMS) using the ($^1H$) or ($^{13}C$) resonance of the deuterated solvents. The number-average and weight-average molar masses (Mn and Mw) and the polydispersity PDI (Mw/Mn) of the polymers were determined by gel permeation chromatography (GPC) using a Polymer Laboratories PL-GPC 50 instrument. Mass spectra were recorded with a high resolution AutoFlex LT spectrometer (Bruker) equipped with a pulsed $N_2$ laser source (337 nm, 4 ns pulse width).

Example 1

Synthesis of (2-oxo-1,3-dioxolan-4-yl)methyl propenoate (chain transfer agent or CTA)

The reaction was carried out according to the following scheme 1:

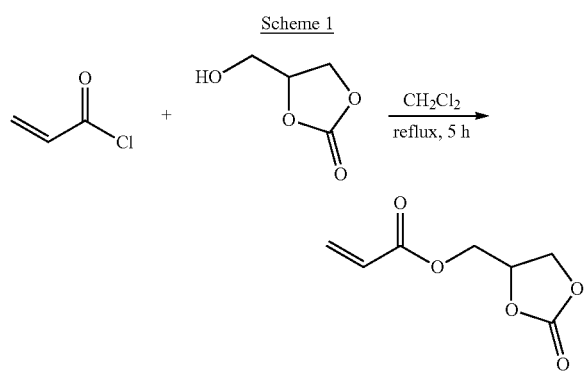

4.8 ml (5.7 g) of acryloyl chloride were added dropwise at room temperature to a solution of 7 g of glycerol carbonate in dry dichloromethane (15 ml). The resulting clear solution was slowly heated to 45° C. and subjected to reflux for an additional 5 hours. At the end of this period, the solution was cooled to ambient temperature and the solvent was removed by distillation. The crude oily product thus obtained was purified by distillation under vacuum. A clear and colorless product was obtained (yield 9.2 g, i.e. 90%). The NMR data of this product were as follows: $^1$H NMR (CDCl$_3$, 298 K): δ=4.3-4.6 (4H, m, CH$_2$—CH—CH$_2$OCOO), 4.9 (1H, m, CH$_2$—CH—CH$_2$OCOO), 5.9 (1H, d, $J_{HH}$=10.7 Hz, CH$_2$=CH), 6.1 (1H, m, CH$_2$=CH), 6.4 (1H, d, $J_{HH}$=17.2 Hz, CH$_2$=CH). $^{13}$C{$^1$H} NMR (CDCl$_3$, 298 K): δ=63.2, 66.2 (CH$_2$-5CC), 74.0 (CH-5CC), 127.2 (CH$_2$=CH—), 132.5 (CH$_2$=CH—), 154.8 (O=COO), 165.5 (O=CO).

(2-Oxo-1,3-dioxolan-4-yl)methyl propenoate (CTA) of formula (11):

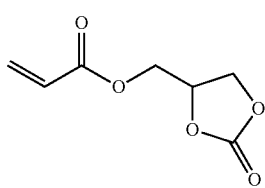

(11)

was thus obtained.

Example 2

Synthesis of an unsaturated polyolefin, comprising two (2-oxo-1,3-dioxolan-4-yl)methyloxycarbonyl end groups from COE and the CTA synthesized in example 1

The reaction was carried out according to the following scheme 2:

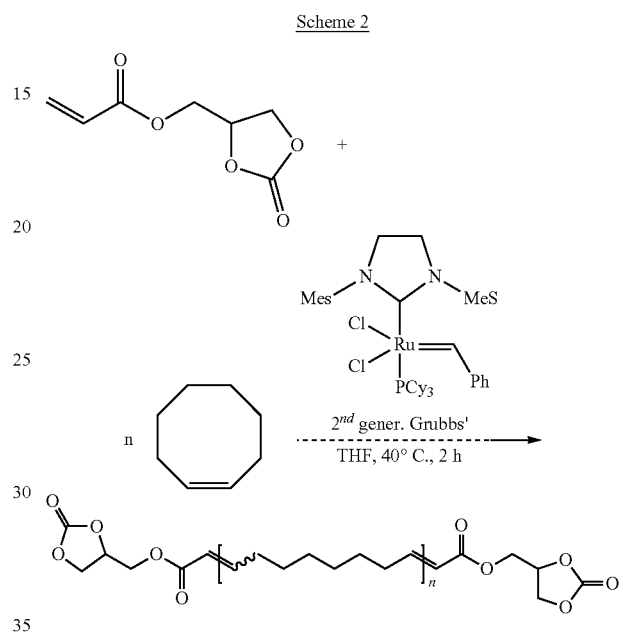

The polymerization was carried out normally according to the data below. A 100 ml flask was charged, with stirring and sequentially, with THF (tetrahydrofuran) (5 ml), COE (1.4 ml) and the appropriate amount of (2-oxo-1,3-dioxolan-4-yl) methyl 2-propenoate transfer agent. The resulting solution was thermostatically controlled at 40° C. and the polymerization was initiated by injection of a precatalyst solution prepared by dissolving a 2$^{nd}$ generation Grubbs' catalyst ("RU") (5.0 mg) in THF (3 ml). After reacting for 2 hours, the mixture was poured into cold acidified methanol. The polymers present were recovered by filtration and dried at 25° C. under vacuum.

The compound of formula (10) was thus synthesized.

Various tests were carried out according to this reaction. They are summarized in table 1 below.

TABLE 1

| Test | [CTA]/[Ru] (mol/mol) | [COE]/[CTA] (mol/mol) | Conv. (%) | Mn$_{GPC}$ (g/mol) | PDI |
|---|---|---|---|---|---|
| T1 | 30 | 66 | 100 | 47800 | 1.60 |
| T2 | 50 | 40 | 100 | 12200 | 1.69 |
| T3 | 80 | 80 | 100 | 7900 | 1.48 |
| T4 | 50 | 3 | 100 | 2200 | 1.51 |

NMR analyses of the polymer obtained in the test T2 gave the following values, which confirm the structural formula (10) of this polymer. $^1$H NMR (CDCl$_3$, 500 MHz, 298 K)—trans repeat unit: 1.30, 1.97, 5.39; cis repeat unit: 1.30, 2.03, 5.34; end group: 2.25 (m, 2H, —CH$_2$—CH=CH—COO), 4.30, 4.63 (m, 4H, —CH$_2$—CH—CH$_2$OCOO), 4.96

(m, 1H, —CH$_2$—CH—CH$_2$OCOO), 5.87 (d, J$_{trans}$=15.2 Hz, 1H, —CH=CH—COO), 7.07 (m, 1H, —CH=CH—COO, J$_{trans}$=15.0 Hz, J=7.0 Hz). $^{13}$C NMR (CDCl$_3$, 125 MHz, 298 K)—repeat unit: 130.34 (trans), 129.88 (cis), 32.63, 29.77, 29.69, 29.24, 29.20, 29.07, 27.26; end group: 62.80, 66.0 (—CH$_2$—CH—CH$_2$OCOO), 73.87 (—CH$_2$—CH—CH$_2$OCOO), 119.50 (—CH=CH—COO—), 152.04 (—CH=CH—COO), 154.6 (O=COO), 165.9 (OC=O).

Example 3

Synthesis of a saturated polyolefin comprising two (2-oxo-1,3-dioxolan-4-yl)methyloxycarbonyl end groups by catalytic hydrogenation of an unsaturated polyolefin comprising two (2-oxo-1,3-dioxolan-4-yl) methyloxycarbonyl end groups of example 2

The reaction is carried out according to the following scheme 3:

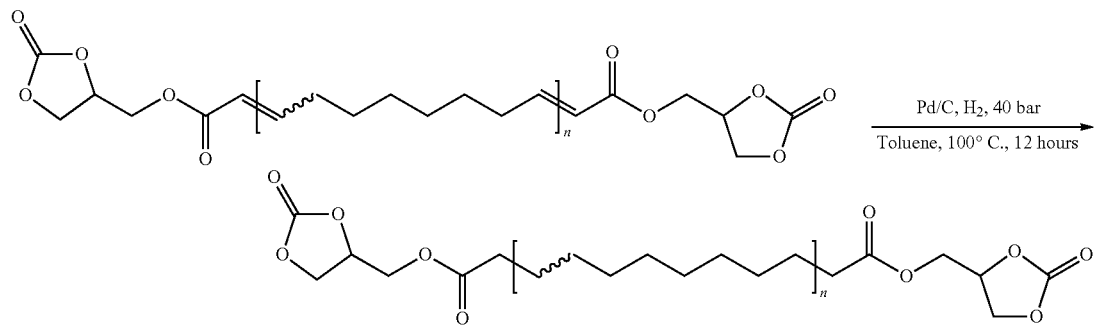

Scheme 3

0.500 g of polymer was introduced into 20 ml of toluene in a 50 ml reactor equipped with a magnetic bar, and then 0.05 g of Pd/C (10% by weight) catalyst was introduced. The reactor was brought to 40 bar (approximately 4 MPa) under hydrogen pressure and 100° C. for 12 hours. The mixture was subsequently cooled to ambient temperature and ventilated, and then the suspension was poured into methanol. The polymer was recovered by extraction with toluene under hot conditions. The solution was subsequently again poured into methanol and the precipitate, in the form of a white powder, was recovered by filtration and dried under vacuum at 40° C.

The hydrogenation of the double bonds was confirmed by $^1$H and $^{13}$C NMR.

Example 4

Synthesis of polyurethanes from an unsaturated polyolefin comprising two (2-oxo-1,3-dioxolan-4-yl)methyloxycarbonyl end groups of example 2

A mixture of one of the polyolefins comprising two (2-oxo-1,3-dioxolan-4-yl)methyloxycarbonyl end groups of example 2 and of di(primary amine) of polyether diamine type (Jeffamine EDR 176, Huntsman) was reacted, separately, at 80° C. and in a stoichiometric ratio, until complete disappearance of the infrared band characteristic of the 1,3-dioxolan-2-one groups (at 1800 cm$^{-1}$) and the appearance of the bands characteristic of the carbamate bond (band at 1700 cm$^{-1}$). The duration of reaction was approximately 72 hours.

In each case, the product thus synthesized resulted in the formation of a polyurethane, which two-component mixture, appropriately formulated, made it possible to obtain adhesive properties.

Example 5

Synthesis of an unsaturated polyolefin comprising two 2-oxo-1,3-dioxolan-4-yl end groups from cyclooctene and the 4-vinyl-1,3-dioxolan-2-one chain transfer agent The synthesis reaction was carried out by ROMP ring opening polymerization of cyclooctene (COE) in the presence of a Grubbs' catalyst and of the 4-vinyl-1,3-dioxolan-2-one transfer agent (CTA).

The reaction was carried out according to the following scheme 4:

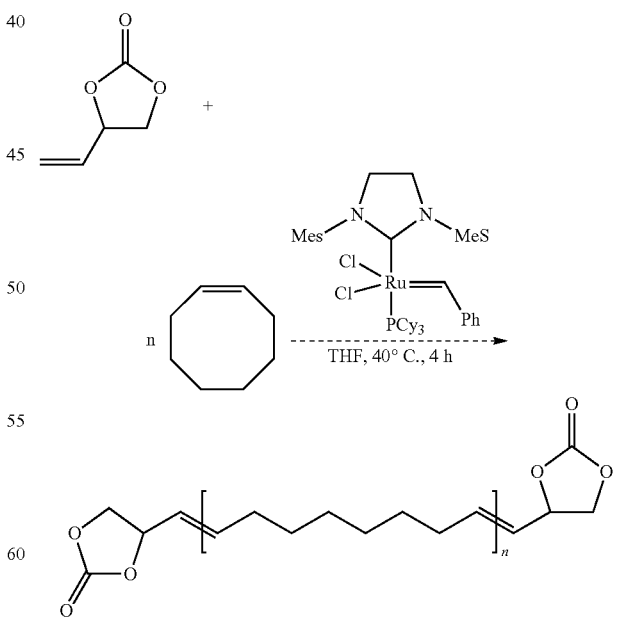

Scheme 4

The polymerization was carried out normally according to the data below. A 100 ml flask was charged, with stirring and sequentially, with THF (tetrahydrofuran) (5 ml), COE (1.4 ml) and the appropriate amount of 4-vinyl-1,3-dioxolan-2-one transfer agent. The resulting solution was thermostatically controlled at 40° C. and the polymerization was initiated by injection of a precatalyst solution prepared by dissolving a $2^{nd}$ generation Grubbs' catalyst ("RU") (5.0 mg) in THF (3 ml). The ratio of COE to CTA was 20. After reacting for four hours, the mixture was poured into cold acidified methanol. The polymers present were recovered by filtration and dried at 25° C. under vacuum.

NMR analyses of the polymer obtained in the test gave the following values, which confirm the structure of the formula of this polymer: $^1$H NMR (CDCl$_3$, 400 MHz, 298 K): δ=trans unit of the main chain: 1.30, 1.97, 5.39; cis unit of the main chain: 1.30, 2.03, 5.34; cyclocarbonate chain end: 4.12, 4.56 (t, 2H, CH═CH—CH—CH$_2$OCOO), 5.09 (m, 1H, —CH═CH—CH—CH$_2$OCOO), 5.53 (dt, 1H, $J_{trans}$=15.0 Hz, —CH═CH—CH—CH$_2$OCOO), 5.97 (m, $J_{trans}$=14.8 Hz, J=7.0 Hz, 1H, —CH═CH—CH—CH$_2$OCOO). $^{13}$C {$^1$H} NMR (CDCl$_3$, 125 MHz, 298 K): δ=trans unit of the main chain: 130.34 (trans); cis unit of the main chain: 129.88 (cis), 32.63, 29.77, 29.69, 29.24, 29.20, 29.07, 27.26; cyclocarbonate chain end: 69.51, 78.24, 123.89, 140.02 (—CH═CH—CH—CH$_2$OCOO), 155.10 (O═CO).

The invention claimed is:

1. A process for the preparation of at least one hydrocarbon polymer comprising two end groups having 2-oxo-1,3-dioxolan-4-yl final parts, said process comprising at least one stage of ring opening metathesis polymerization in the presence:
of at least one metathesis catalyst;
of at least one chain transfer agent (CTA) compound of formula (15):

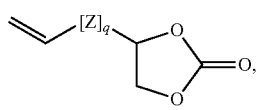

the Z group being composed of at least one alkylene group optionally connected to a divalent carboxyl or oxy group, the Z group comprising from 1 to 19 carbon atoms and q being an integer equal to 0 or 1; and
of at least one compound comprising at least one hydrocarbon ring, carbon atoms per ring, said ring comprising at least one carbon-carbon double bond, or substituted derivatives of this compound, said compound being of formula (7):

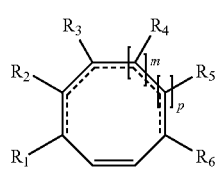

in which:
each carbon-carbon bond of the chain denoted ⌇ is a double bond or a single bond, in accordance with the valency rules of organic chemistry;

the $R_1$ and $R_6$ groups are either both hydrogen or each different from hydrogen and bonded to one another as members of one and the same ring or heterocycle which is saturated or unsaturated, said unsaturated rings comprising at least one carbon-carbon double bond, and said unsaturated rings including aromatics;

the $R_2$, $R_3$, $R_4$ and $R_5$ groups are each, independently or not of the other groups, a hydrogen, a halo group, an alkoxycarbonyl group or an alkyl group, it being possible for the $R_2$ to $R_5$ groups to be bonded to one another as members of one and the same saturated or unsaturated ring or heterocycle;

m and p are integers each within a range extending from 0 to 5, the sum m+p being itself within a range from 0 to 6;

said stage being carried out for a period of time strictly of greater than 3 h when the compound of formula (15) is 4-vinyl-1,3-dioxolan-2-one and for a period of time of greater than or equal to 2 h in all the other cases.

2. The preparation process as claimed in claim 1, said process being such that the compound of formula (15) is 4-vinyl-1,3-dioxolan-2-one, 4-(vinyloxymethyl)-1,3-dioxolan-2-one, 4-(acryloyloxymethyl)-1,3-dioxolan-2-one, a 4-(alkenyloxymethyl)-1,3-dioxolan-2-one or a 4-(alkenoyloxymethyl)-1,3-dioxolan-2-one.

3. The preparation process as claimed in claim 1, said process additionally comprising at least one additional hydrogenation of carbon-carbon double bonds.

4. A hydrocarbon polymer comprising two end groups having 2-oxo-1,3-dioxolan-4-yl final parts which is obtained by the process as claimed in claim 1.

5. The hydrocarbon polymer comprising two end groups having 2-oxo-1,3-dioxolan-4-yl final parts as claimed in claim 4, said hydrocarbon polymer being of formula (1):

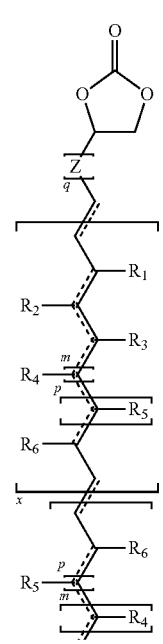

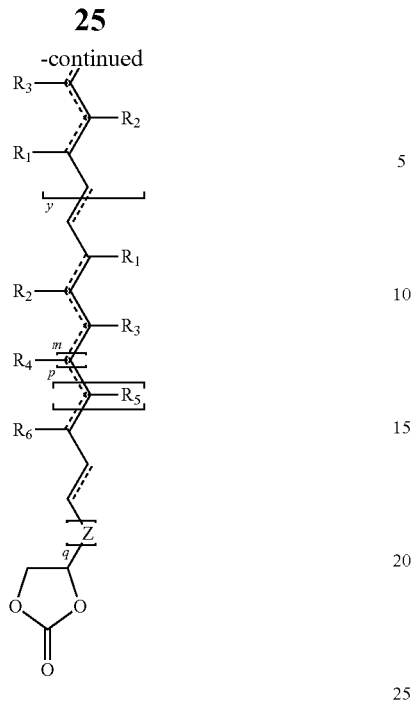

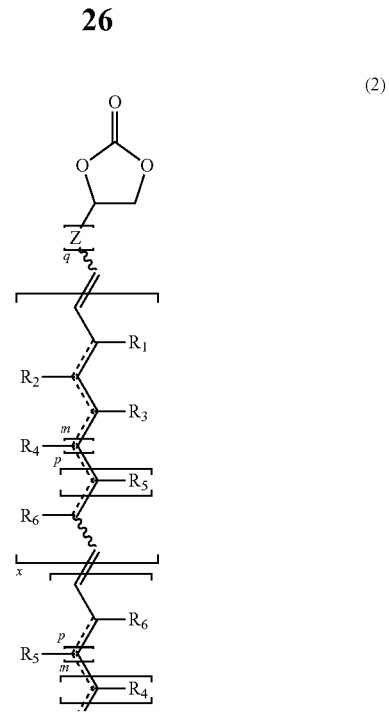

(2)

in which:

each carbon-carbon bond of the chain denoted ⇌ is a double bond or a single bond, in accordance with the valency rules of organic chemistry;

the $R_1$ and $R_6$ groups are either both hydrogen or each different from hydrogen and bonded to one another as members of one and the same ring or heterocycle which is saturated or unsaturated, said unsaturated rings comprising at least one carbon-carbon double bond, and said unsaturated rings including aromatics;

the $R_2$, $R_3$, $R_4$ and $R_5$ groups are each, independently or not of the other groups, a hydrogen, a halo group, an alkoxycarbonyl group or an alkyl group, it being possible for the $R_2$ to $R_5$ groups to be bonded to one another as members of one and the same saturated or unsaturated ring or heterocycle;

the Z group is composed of at least one alkylene group optionally connected to a divalent carboxyl or oxy group, the Z group comprising from 1 to 19 carbon atoms;

q is a number equal to 0 or 1;

m and p are integers each within a range extending from 0 to 5, the sum m+p being itself within a range from 0 to 6; and x and y are each an integer, independently of one another, the sum x+y being such that the number-average molar mass Mn of the hydrocarbon polymer of formula (1) is within a range from 600 to 20 000 g/mol, and the polydispersity (PDI) of the hydrocarbon polymer of formula (1) is within a range from 1.1 to 3.0.

6. The hydrocarbon polymer comprising two end groups having 2-oxo-1,3-dioxolan-4-yl final parts as claimed in claim 5, said hydrocarbon polymer being of formula (2) or of formula (3):

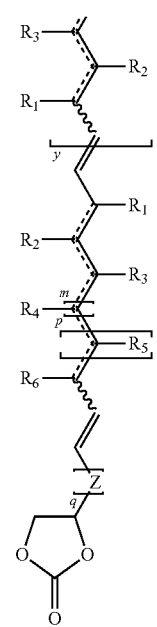

(3)

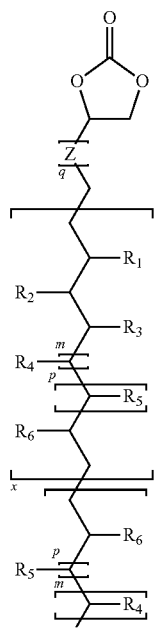

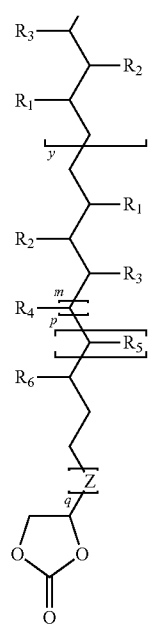

(4)

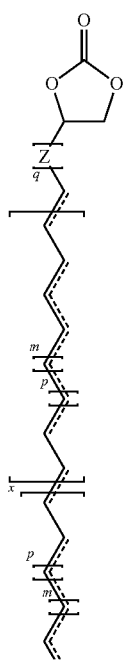

in which ⁓, m, p, q, Z, x, y, $R_1$, $R_2$, $R_3$, $R_4$, $R_5$ and $R_6$ have the meanings given in claim 5 and the ⁓ bond means that the bond is oriented geometrically on one side or the other with respect to the double bond (cis or trans).

7. The hydrocarbon polymer comprising two end groups having 2-oxo-1,3-dioxolan-4-yl final parts as claimed in claim 5, said hydrocarbon polymer being of formula (4):

in which ⁓, m, p, q, Z, x and y have the meanings given in claim 5.

8. The hydrocarbon polymer comprising two end groups having 2-oxo-1,3-dioxolan-4-yl final parts as claimed in claim 7, said hydrocarbon polymer being of formula (5) or of formula (6):

(5)

(6)

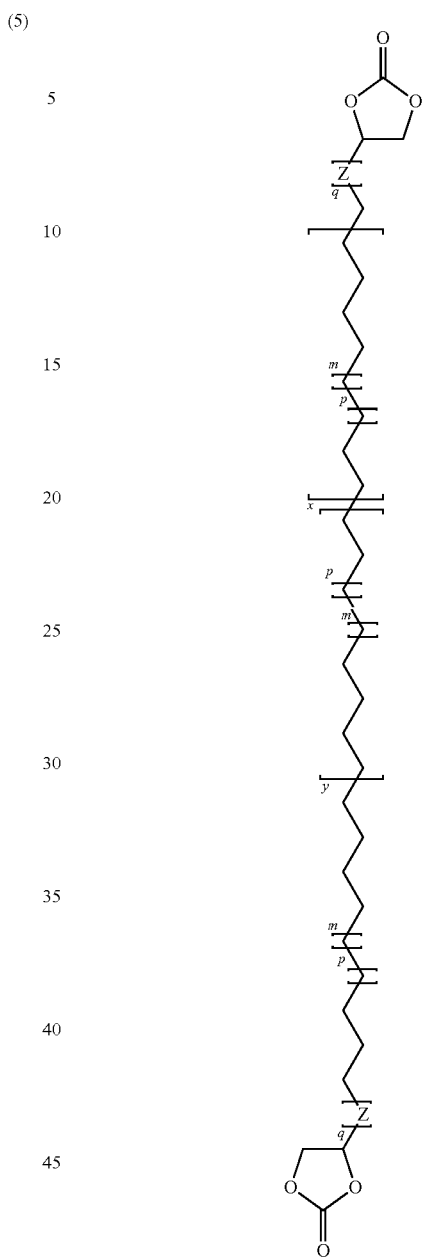

in which the ⁓ bond means that the bond is oriented geometrically on one side or the other with respect to the double bond (cis or trans).

9. A process for the preparation of polyurethanes comprising the reaction of at least one hydrocarbon polymer as claimed in claim 4 with at least one compound comprising at least one amine group.

10. A polyurethane obtained by the preparation process as claimed in claim 9.

11. The process according to claim 1, wherein the metathesis catalyst is a ruthenium-containing catalyst.

12. The process according to claim 1, wherein the catalyst is a Grubbs catalyst.

13. The process according to claim 1, wherein the compound comprising at least one hydrocarbon ring has 6 to 16 carbon atoms per ring.

14. The process according to claim 1, wherein the compound comprising at least one hydrocarbon ring has 6 to 12 carbon atoms per ring.

15. The hydrocarbon polymer according to claim 5, wherein the PDI is 1.4 to 2.5.

16. The process according to claim 9, wherein the hydrocarbon polymer is reacted with at least one compound comprising at least two amine groups.

17. The process according to claim 16, wherein the compound comprising at least two amine groups is a diamine, triamine or polyamine.

\* \* \* \* \*